(12) United States Patent
Holm et al.

(10) Patent No.: US 10,366,115 B2
(45) Date of Patent: *Jul. 30, 2019

(54) ROUTING QUERY RESULTS

(71) Applicant: Microsoft Technology Licensing, LLC, Redmond, WA (US)

(72) Inventors: Fredrik Holm, Oslo (NO); Puneet Narula, Bothell, WA (US); Victor Poznanski, Sammamish, WA (US); Viktoriya Taranov, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/417,790

(22) Filed: Jan. 27, 2017

(65) Prior Publication Data

US 2017/0132316 A1 May 11, 2017

Related U.S. Application Data

(63) Continuation of application No. 13/287,997, filed on Nov. 2, 2011, now Pat. No. 9,558,274.

(51) Int. Cl.
| | | |
|---|---|---|
| *G06F 7/00* | (2006.01) | |
| *G06F 17/30* | (2006.01) | |
| *G06F 16/338* | (2019.01) | |
| *G06F 16/25* | (2019.01) | |
| *G06F 16/951* | (2019.01) | |

(Continued)

(52) U.S. Cl.
CPC .......... *G06F 16/338* (2019.01); *G06F 16/256* (2019.01); *G06F 16/3325* (2019.01); *G06F 16/3329* (2019.01); *G06F 16/3338* (2019.01); *G06F 16/951* (2019.01)

(58) Field of Classification Search
CPC .. G06F 16/338; G06F 16/3338; G06F 16/256; G06F 16/3329; G06F 16/3325; G06F 16/951; G06F 7/06; G06F 17/30
See application file for complete search history.

(56) References Cited

U.S. PATENT DOCUMENTS

| | | | |
|---|---|---|---|
| 5,956,707 A | 9/1999 | Churchill et al. | |
| 6,122,664 A | 9/2000 | Boukobza | |

(Continued)

FOREIGN PATENT DOCUMENTS

| | | |
|---|---|---|
| CN | 1609859 | 4/2005 |
| CN | 101292236 | 10/2008 |

(Continued)

OTHER PUBLICATIONS

"Advanced Development Techniques using OBIEE Plus", Retrieved on: Aug. 30, 2011, Available at: http://www.rittmanmead.com/files/Advanced%20Development%20Techniques%20Using%20OBIEE%20Plus.pdf.

(Continued)

*Primary Examiner* — Azam M Cheema

(57) ABSTRACT

Systems and method for routing search query results in a networked computing environment. An initial search query is reformulated into at least one sub-query in accordance with one or more configurable rules. The sub-query is sent to at least one information system or source, and any potential hits associated with the same are optionally combined and then rendered for viewing.

20 Claims, 6 Drawing Sheets

(51) Int. Cl.
  *G06F 16/332* (2019.01)
  *G06F 16/33* (2019.01)

(56) References Cited

U.S. PATENT DOCUMENTS

| | | |
|---|---|---|
| 7,149,738 B2 | 12/2006 | Kumar et al. |
| 7,162,473 B2 | 1/2007 | Dumais |
| 7,440,964 B2 | 10/2008 | Gosse et al. |
| 7,591,010 B2 | 9/2009 | Shelest et al. |
| 7,640,236 B1* | 12/2009 | Pogue .............. G06F 17/30867 |
| 7,962,633 B1 | 6/2011 | Sidebottom et al. |
| 8,041,713 B2* | 10/2011 | Lawrence ......... G06F 17/30572 707/726 |
| 8,341,692 B1 | 12/2012 | Boyer et al. |
| 9,177,022 B2 | 11/2015 | Taranov et al. |
| 9,189,563 B2 | 11/2015 | DeRose et al. |
| 9,558,274 B2* | 1/2017 | Holm .............. G06F 17/30864 |
| 2003/0051020 A1 | 3/2003 | Kadam et al. |
| 2003/0078914 A1 | 4/2003 | Witbrock |
| 2004/0215630 A1 | 10/2004 | Parekh et al. |
| 2004/0243587 A1 | 12/2004 | Nuyens et al. |
| 2005/0021504 A1 | 1/2005 | Atchinson |
| 2005/0091671 A1 | 4/2005 | Deem et al. |
| 2005/0138018 A1 | 6/2005 | Sakai et al. |
| 2005/0154744 A1 | 7/2005 | Morinville |
| 2006/0036581 A1 | 2/2006 | Chkrbarti |
| 2006/0167858 A1 | 7/2006 | Dennis et al. |
| 2006/0224607 A1 | 10/2006 | Tchtaithian et al. |
| 2006/0236381 A1 | 10/2006 | Weeden |
| 2006/0287980 A1 | 12/2006 | Liu et al. |
| 2007/0219979 A1 | 9/2007 | Jung et al. |
| 2007/0266002 A1 | 11/2007 | Chowdhury |
| 2007/0282986 A1 | 12/2007 | Childress et al. |
| 2007/0294225 A1 | 12/2007 | Radlinkski |
| 2008/0154608 A1* | 6/2008 | Evermann ......... G06F 17/30864 704/270.1 |
| 2008/0209047 A1 | 8/2008 | Beigi et al. |
| 2008/0288467 A1 | 11/2008 | Szeto et al. |
| 2008/0301113 A1 | 12/2008 | Chi et al. |
| 2009/0094216 A1 | 4/2009 | Hou et al. |
| 2009/0094234 A1 | 4/2009 | Marvit |
| 2009/0100015 A1 | 4/2009 | Golan |
| 2009/0171907 A1 | 7/2009 | Radovanovic |
| 2009/0234799 A1 | 9/2009 | Betawadkar-Norwood et al. |
| 2009/0292700 A1 | 11/2009 | Castellani |
| 2009/0299992 A1 | 12/2009 | Klinger et al. |
| 2009/0307205 A1 | 12/2009 | Churchill et al. |
| 2009/0319385 A1 | 12/2009 | Jackson et al. |
| 2009/0328129 A1 | 12/2009 | Desai et al. |
| 2010/0005496 A1 | 1/2010 | Ellis et al. |
| 2010/0085906 A1 | 4/2010 | Yamamoto |
| 2010/0106724 A1 | 4/2010 | Anderson |
| 2010/0145944 A1 | 6/2010 | Punera |
| 2010/0185678 A1 | 7/2010 | Dettinger et al. |
| 2010/0223546 A1 | 9/2010 | Liu |
| 2010/0256969 A1* | 10/2010 | Li ..................... G06K 9/6296 703/16 |
| 2010/0257193 A1* | 10/2010 | Krupka ............. G06F 17/30672 707/768 |
| 2011/0016104 A1 | 1/2011 | Leconte |
| 2011/0137902 A1 | 6/2011 | Wable et al. |
| 2011/0153671 A1 | 6/2011 | Taniguchi |
| 2011/0208670 A1 | 8/2011 | Joseph et al. |
| 2011/0246499 A1 | 10/2011 | Carmel et al. |
| 2011/0265189 A1 | 10/2011 | Liao et al. |
| 2012/0072406 A1 | 3/2012 | Iwakura et al. |
| 2012/0089641 A1* | 4/2012 | Wilde ............... G06F 17/30643 707/771 |
| 2013/0046787 A1 | 2/2013 | Ford et al. |
| 2013/0110795 A1 | 5/2013 | DeRose et al. |
| 2013/0110813 A1 | 5/2013 | Holm et al. |
| 2013/0110816 A1 | 5/2013 | Holm et al. |
| 2013/0110860 A1 | 5/2013 | Taranov et al. |
| 2016/0041953 A1 | 2/2016 | DeRose et al. |
| 2018/0032486 A1 | 2/2018 | DeRose et al. |

FOREIGN PATENT DOCUMENTS

| | | |
|---|---|---|
| CN | 102043833 | 5/2011 |
| CN | 102165447 | 8/2011 |
| CN | 1556482 | 12/2014 |
| KR | 10-0714504 | 5/2007 |
| WO | 2006/071928 | 7/2006 |

OTHER PUBLICATIONS

"Managing Firewall Services", Retrieved on: Aug. 30, 2011, Available at: http://www.cisco.com/en/US/docs/security/security_management/cisco_security_manager/security_manager/3.1/user/guide/porules.html.

"Symantec Endpoint Protection 11.0", Retrieved on: Sep. 13, 2011, Available at: http://www.symantec.com/ avcenter/security/ADC/Configuring_Application_Control_1.1.pdf.

"What is Visitor Traffic & Analytic Rules and How is it Setup?", Retrieved on: Sep. 2, 2011, Available at: http://www.americommerce.com/kb/afmviewfaq.aspx?faqid=297.

Anagnostopoulos et al., "An Optimization Framework for Query Recommendation", Copyright 2010, 10 pages.

Aronis et al., The World: Knowledge Discovery from Multiple Distributed Databases, published 1997, 5 pages.

Chinese 3rd Office Action in Application 201210429730.4, dated May 27, 2016, 16 pgs.

Chinese 4th Office Action in Application 201210429730.4, dated Nov. 22, 2016, 12 pgs.

Chinese Notice of Allowance in 201210428079.9, dated Sep. 17, 2015, 4 pages.

Chinese Office Action and Search Report in 201210428079.9, dated Jan. 7, 2015, 12 pages.

Chinese Office Action in 201210429730.4, dated Jan. 23, 2015, 15 pages.

Chinese Office Action in 201210429730.4, dated Nov. 30, 2015, 11 pages.

Curran, Steve, "SharePoint 2010 Search Scopes Explained", Published on: Jul. 23, 2011, Available at: http://sharepointfieldnotes.blogspot.com/2011_07_01_archive.html.

Elmongui et al., A Framework for Testing Query Transformation Rules, copyright 2009, 12 pages.

European Extended Search Report in 12845302.4, dated Aug. 21, 2015, 8 pages.

Ioannidis, Yannis E., Query Optimization, Journal of ACM Computing Surveys, vol. 28, Issue 1, published 1996, 38 pages.

Japanese Office Action in 200993648, dated Jul. 4, 2016, 12 pages.

Mexican Office Action in MX/a/2014/005402, dated Aug. 30, 2016, 2 pages. (No English Translation).

PCT International Preliminary Report on Patentability in PCT/US2012/063134, dated May 15, 2014, 7 pages.

PCT International Search Report in PCT/US2012/063135, dated Mar. 28, 2013, pages.

PCT International Search Report in PCT/US2012/063134, dated Mar. 11, 2013, 10 pages.

Pirahesh, et al., "A Rule Engine for Query Transformation in Starburst and IBM DB2 C/S DBMS: The Missing Manual", In Proceedings of 13th International Conference on Data Engineering, Apr. 7-11, 1997, pp. 391-400.

Query Rewrite Optimization Guidelines, accessed at: http://publib.boulder.ibm.com/infocenter/db2luw/v9r7/index.jsp?topic=%2Fcom.ibm.db2.luw.admin.perf.doc%2Fdoc%2Fc0024525.html, accessed on Sep. 5, 2011, 4 pages.

Rittman, Mark, Advanced Development Techniques using OBIEE Plus, accessed at http://www.rittmanmead.com/files/Advanced%20Development%20Techniques%20Using%20OBIEE%20Plus.pdf accessed on Sep. 5, 2011, 86 pages.

Russian Office Action in Application 2014117708, dated Sep. 27, 2016, 6 pgs. (No English translation).

Set operations (SQL), accessed at http://en.wikipedia.org/wiki/Set_operations_(SQL), accessed on Sep. 5, 2011, 4 pages.

Shankar, et al., "An ECA-P Policy-based Framework for Managing Ubiquitous Computing Environments", In Proceedings of the Sec-

(56) References Cited

OTHER PUBLICATIONS ond Annual International Conference on Mobile and Ubiquitous Systems: Networking and Services, Jul. 17-21, 2005, 10 pages.
Shankar, et al., "Specification-enhanced Policies for Automated Management of Changes in IT Systems", In Proceedings of the 20th conference on Large Installation System Administration, 2006, 16 pages.
Update Statement, accessed at: http://publib.boulder.ibm.com/infocenter/db2luw/v8/index.jsp?topic=/com.ibm.db2.udb.doc/admin/r0001022.htm accessed on Sep. 5, 2011, 9 pages.
U.S. Appl. No. 13/287,645, Notice of Allowance dated Jul. 8, 2015, 7 pages.
U.S. Appl. No. 13/287,645, Office Action dated May 8, 2013, 13 pages.
U.S. Appl. No. 13/287,645, Office Action dated Dec. 3, 2013, 16 pages.
U.S. Appl. No. 13/287,645, Office Action dated May 22, 2014, 16 pages.
U.S. Appl. No. 13/287,645, Office Action dated Mar. 16, 2015, 16 pages.
U.S. Appl. No. 13/287,717, Notice of Allowance dated Jun. 30, 2015, 8 pages.
U.S. Appl. No. 13/287,717, Office Action dated Sep. 30, 2013, 13 pages.
U.S. Appl. No. 13/287,717, Office Action dated May 8, 2014, 17 pages.
U.S. Appl. No. 13/287,717, Office Action dated Jan. 9, 2015, 19 pages.
U.S. Appl. No. 13/287,997, Notice of Allowance dated Sep. 26, 2016, 7 pages.
U.S. Appl. No. 13/287,997, Office Action dated Jan. 17, 2014, 11 pages.
U.S. Appl. No. 13/287,997, Office Action dated Jun. 17, 2014, 14 pages.
U.S. Appl. No. 13/287,997, Office Action dated May 4, 2015, 15 pages.
U.S. Appl. No. 13/287,997, Office Action dated Oct. 14, 2015, 16 pages.
U.S. Appl. No. 13/287,997, Office Action dated May 3, 2016, 19 pages.
U.S. Appl. No. 13/287,999, Office Action dated Jun. 17, 2014, 19 pages.
U.S. Appl. No. 13/287,999, Office Action dated Feb. 6, 2014, 29 pages.
U.S. Appl. No. 13/287,999, Office Action dated Apr. 24, 2015, 25 pages.
U.S. Appl. No. 14/878,011, Office Action dated Jan. 11, 2017, 18 pages.
Chinese Notice of Allowance in Application 201210429730.4, dated Apr. 27, 2017, 4 pgs.
U.S. Appl. No. 14/878,011, Notice of Allowance dated Jun. 14, 2017, 8 pages.
U.S. Appl. No. 14/878,011, 312 Amendment and Response filed Jun. 28, 2017, 3 pages.
U.S. Appl. No. 14/878,011, Response to 312 amendment dated Jul. 10, 2017, 2 pages.
European Extended Search Report in 17173960.0, dated Sep. 22, 2017, 14 pages.
"Non Final Office Action Issued in U.S. Appl. No. 15/725,939", dated Nov. 9, 2018, 13 Pages.
"Office Action Issued in European Patent Application No. 12845302.4", dated Apr. 30, 2019, 9 Pages.

* cited by examiner

ROUTING QUERY RESULTS

CROSS-REFERENCE TO RELATED APPLICATIONS

This application is a continuation application and claims priority to U.S. patent application Ser. No. 13/287,997, entitled "Routing Query Results," filed Nov. 2, 2011, now issued U.S. Pat. No. 9,558,274, which related to U.S. patent application Ser. No. 13/287,999, entitled "default Query Rules," filed Nov. 2, 2011, the entirety of which is hereby incorporated by reference.

BACKGROUND

A web part is a re-useable software component that implements one or more controls that enable end users to view and modify content, appearance, and behavior of Web pages directly from a browser. In general, web parts may have queries associated with them, and results of a given query may be rendered by particular web part. However, such queries are typically hard-coded, and therefore may preclude the use of conditional logic to drive an associated web part.

SUMMARY

In one aspect, a computer-implemented method for routing search query results in a networked computing environment is disclosed. The method includes: receiving, at an application executing on a first computing device, a search string comprising at least one key term; generating a plurality of queries based on the at least one key term, wherein each one of the plurality of queries include at least one query expression; sending each one of the plurality of queries to at least one information source for evaluation of a corresponding at least one query expression against information accessible to the at least one information source; receiving a plurality of query results, wherein each one of the plurality of query results include a result classification identifying a type of a corresponding query result; combining at least two of the plurality of query results into a combined query result based on the result classification of each of the at least two of the plurality of query results; and sending at least the combined query result to a second computing device in the networked computing environment for rendering within an interface executing thereon.

In another aspect, a computing device including a processing unit and a system memory connected to the processing unit is disclosed. The system memory includes instructions that, when executed by the processing unit, cause the processing unit to implement a mapping module, a results module, and a web part module, each configured to route search query results in a networked computing environment. The mapping module is configured to: generate a plurality of queries based on at least one key term, wherein each one of the plurality of queries include at least one query expression; and send each one of the plurality of queries to at least one information source for evaluation of a corresponding at least one query expression against information accessible to the at least one information source. The results module is configured to: receive a plurality of query results, wherein each one of the plurality of query results include a result classification identifying a type of a corresponding query result. The web part module is configured to: combine at least two of the plurality of query results into a combined query result based on the result classification of each of the at least two of the plurality of query results; and send at least the combined query result to a second computing device in for rendering within an interface executing thereon.

In yet another aspect, a computer-readable storage medium having computer-executable instructions is disclosed that, when executed by a first computing device, cause the first computing device to perform steps including: receive, at an application executing on the first computing device, a search string comprising at least one key term; generate a plurality of queries based on the at least one key term, wherein each one of the plurality of queries include at least one query expression; send each one of the plurality of queries to at least one information source for evaluation of a corresponding at least one query expression against information accessible to the at least one information source; receive a plurality of query results each comprising a results table including a collection of information arranged in a column and row format defined by one of an ordered collection of results and an unordered collection of results, wherein each one of the plurality of query results include a result classification identifying a type of a corresponding query result and a priority classification identifying a significance of a corresponding query result; combine at least two of the plurality of query results into a combined query result based on the result classification and priority classification of each of the at least two of the plurality of query results, wherein the at least two of the plurality of query results are one of interleaved and stacked to form the combined query result; and send at least the combined query result to a second computing device for rendering within an interface executing thereon.

This Summary is provided to introduce a selection of concepts, in a simplified form, that are further described below in the Detailed Description. This Summary is not intended to be used in any way to limit the scope of the claimed subject matter. Rather, the claimed subject matter is defined by the language set forth in the Claims of the present disclosure.

DETAILED DESCRIPTION

The present disclosure is directed towards routing search query results in a networked computing environment. In one example embodiment, an initial search query is reformulated into at least one sub-query in accordance with one or more configurable rules. The sub-query is then sent to at least one information system or source, and any potential hits associated with the same are optionally combined and then rendered for viewing. Although not so limited, an appreciation of the various aspects of the present disclosure will be gained through a discussion of the examples provided below.

Figure 1:
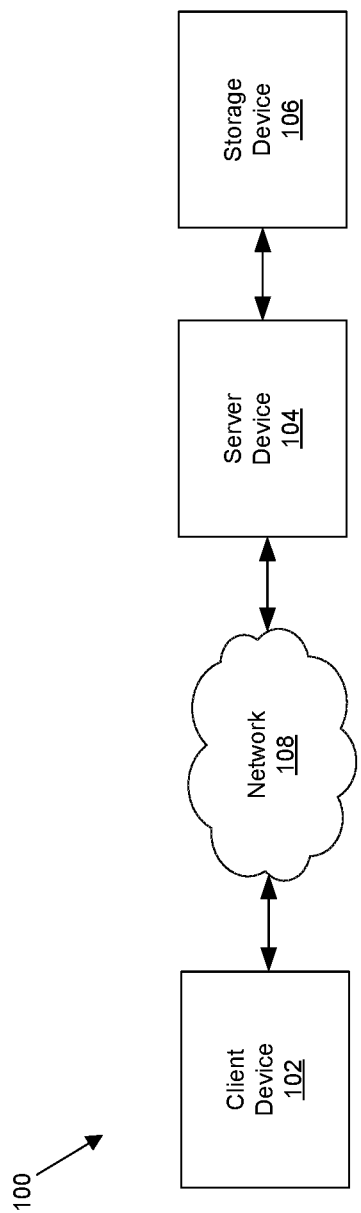
FIG. 1 shows an example networked computing environment.

Referring now to FIG. 1, an example networked computing environment 100 is shown in which aspects of the present disclosure may be implemented. The networked computing environment 100 includes a client device 102, a server device 104, a storage device 106, and a network 108. Other embodiments are possible. For example, the networked computing environment 100 may generally include more or fewer devices, networks, and/or other components as desired.

The client device 102 and the server device 104 are computing devices, as described in further detail below in connection with FIG. 2. In example embodiments, the client device 102 is configured for accessing and interacting with business processes implemented by the server device 104. Example business processes include messaging and communications process, collaboration processes, data management processes, and others. SHAREPOINT® collaboration server from Microsoft Corporation of Redmond, Wash. is an example of a business server that implements business processes in support of collaboration processes, as well as file sharing and web publishing. Other embodiments are possible.

In some embodiments, the server device 104 includes of a plurality of interconnected, networked devices operating together in a "Farm" configuration. In such a scenario, the networked devices provide a "cloud" computing platform in which one or more applications and data are hosted for one or more clients connected to the cloud computing platform. Still other embodiments are possible.

The storage device 106 is an electronic data storage device, such as a relational database or any other type of persistent data storage device. The storage device 106 stores data in a predefined format such that the server device 104 can query, modify, and manage data stored thereon. Example data includes information related to directory services, authentication services, administration services, and other services such as managed by the ACTIVE DIRECTORY® directory service from Microsoft Corporation. Other embodiments are possible.

The network 108 is a bi-directional data communication path for data transfer between one or more devices. In the example shown, the network 108 establishes a communication path for data transfer between the client device 102 and the server device 104. The network 108 can be of any of a number of wireless or hardwired WAN, LAN, Internet, Intranet, or other packet-based communication networks such that data can be transferred among the elements of the example networked computing environment 100.

Figure 2:
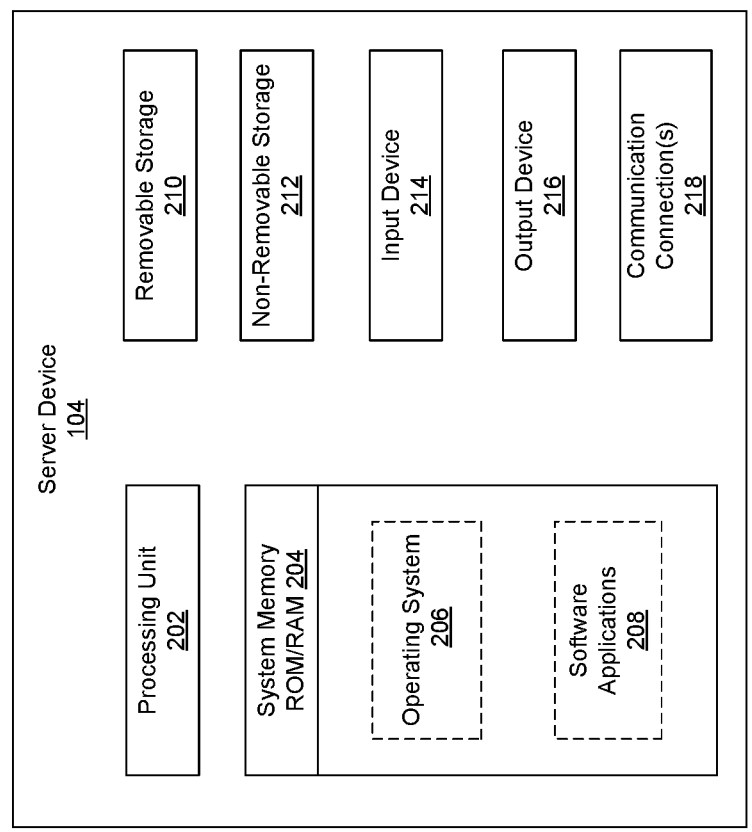
FIG. 2 shows the example server device of FIG. 1 in detail.

Referring now to FIG. 2, the server device 104 of FIG. 1 is shown in detail. As mentioned above, the server device 104 is a computing device. An example computing device includes a server computer, desktop computer, laptop computer, personal data assistant, smartphone, gaming console, and others.

The server device 104 includes at least one processing unit 202 and a system memory 204. The system memory 204 stores an operating system 206 for controlling the operation of the server device 104 or another computing device. One example operating system is the WINDOWS® operating system from Microsoft Corporation. Other embodiments are possible.

The system memory 204 includes one or more software applications 208 and may include program data. Software applications 208 may include many different types of single and multiple-functionality programs, such as a server program, an electronic mail program, a calendaring program, an Internet browsing program, a spreadsheet program, a program to track and report information, a word processing program, and many others. One example program is the Office suite of business applications from Microsoft Corporation. Another example program includes SHAREPOINT® collaboration server, also from Microsoft Corporation of Redmond, Wash. Still other programs are possible.

The system memory 204 is computer-readable media. Examples of computer-readable media include computer-readable storage media and communication media. Computer-readable storage media is physical media that is distinguished from communication media.

The phrase "computer-readable" generally refers to information that can be interpreted and acted on by a computer or computing device. The phrase "storage media" or, equivalently, "storage medium" refers to the various types of physical or tangible material on which electronic data bits are written and stored. Since it is not possible to store information in a transient signal, "computer-readable storage media" as defined within the context of the present disclosure excludes transient signals.

Computer-readable storage media includes physical volatile and nonvolatile, removable and non-removable media implemented in any method or technology for storage of information, such as computer-readable instructions, data structures, program modules, or other data. Computer storage media also includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the server device 104. Any such computer storage media may be part of or external to the server device 104. Such storage is illustrated in FIG. 2 by removable storage 210 and non-removable storage 212.

Communication media is typically embodied by computer-readable instructions, data structures, program modules, or other data, in a transient modulated data signal, such as a carrier wave or other transport mechanism, and includes any information delivery media. The term "modulated data signal" refers to a signal that has one or more of its characteristics set or changed in such a manner as to encode information in the signal. By way of example, communication media includes wired media such as a wired network or direct-wired connection, and wireless media such as acoustic, RF, infrared and other wireless media.

The server device 104 also includes any number and type of an input device 214 and an output device 216. An example input device 214 includes a keyboard, mouse, pen, voice input device, touch input device, motion input device, and others. For example, the input device 214 may be a camera operative to capture and record motions and/or gestures made by a user. The input device 214 may be further operative to capture words spoken by a user, such as by a microphone, and/or capture other inputs from user such as by a keyboard and/or mouse. Consistent with embodiments of the present disclosure, the input device 214 may comprise any motion detection device capable of detecting the movement of a user. For example, the input device 214 may comprise a KINECT® motion capture device, from Microsoft Corporation. Other embodiments are possible.

An example output device 216 includes a display, speakers, printer, and others. The server device 104 also includes a communication connection 218 configured to enable communications with other computing devices over a network (e.g., network 108 of FIG. 1) in a distributed computing system environment.

Figure 3:
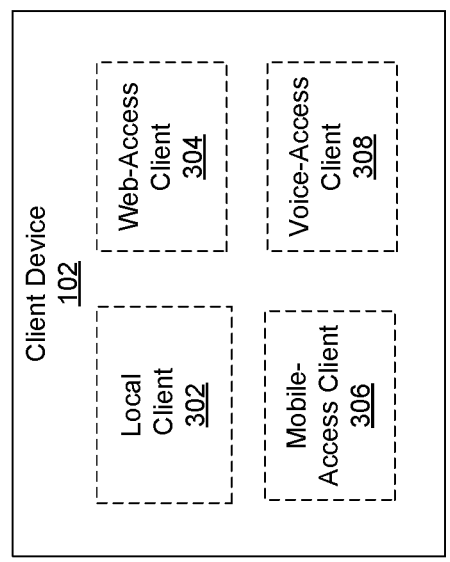
FIG. 3 shows example logical modules of the client device of FIG. 1.

The client device 102 of FIG. 1 is also a computing device configured in a manner similar to that of the server device 104 described above. Referring now to FIG. 3, the client device 102 is also configured to include one or more different types of interfaces to the server device 104. In the example shown, the client device 102 includes a local client 302, a web-access client 304, a mobile-access client 306, and a voice-access client 308.

The local client 302 is configured as a dedicated messaging and collaboration client that serves as an interface to the server device 104, and is part of a suite of applications executing on the client device 102. In one embodiment, the local client 302 includes the OUTLOOK® messaging and collaboration client, which is an e-mail application that is part of the Office suite of business applications from Microsoft Corporation. A user can compose, interact with, send and receive e-mails with the OUTLOOK® messaging and collaboration client. Other embodiments of the local client 302 are possible. For example, in one embodiment, the local client 302 includes the Office Communicator client from Microsoft Corporation, an instant messaging client used with Office Communications Server. Still other embodiments are possible.

The web-access client 304 is configured to accesses the server device 104 remotely via a network connection, such as the Internet. In one embodiment, the web-access client 304 is the Outlook Web Access (OWA) webmail service of Exchange Server. In the example embodiment, the client device 102 uses a web browser to connect to Exchange Server via Outlook Web Access. This brings up a user interface similar to the interface in the OUTLOOK® messaging and collaboration client in which a user can compose, interact with, send and receive e-mails. Other embodiments of the web-access client 304 are possible. For example, the web-access client 304 may be configured to connect to SHAREPOINT® collaboration server to access corresponding collaboration, file sharing and web publishing services. Still other embodiments are possible.

The mobile-access client 306 is another type of client interface to the server device 104. In one embodiment, the mobile-access client 306 includes the Mobile Access with ACTIVESYNC® synchronization technology, or the Windows Mobile Device Center for WINDOWS VISTA® operating system or Windows 7 operating system, all from Microsoft Corporation. Example mobile devices include a cellular telephone, smartphone, a personal digital assistant, and others. Other embodiments of the mobile-access client 306 are possible.

The voice-access client 308 is yet another type of client interface to the server device 104. In some embodiments, the voice-access client 308 includes Exchange Unified Messaging that is supported in Exchange Server. With Unified Messaging, users have one inbox for e-mail and voicemail. Voicemails are delivered directly into the OUTLOOK® messaging and collaboration client inbox. The message containing the voicemails may also include an attachment. Other embodiments of the voice-access client 308 are possible.

Figure 4:
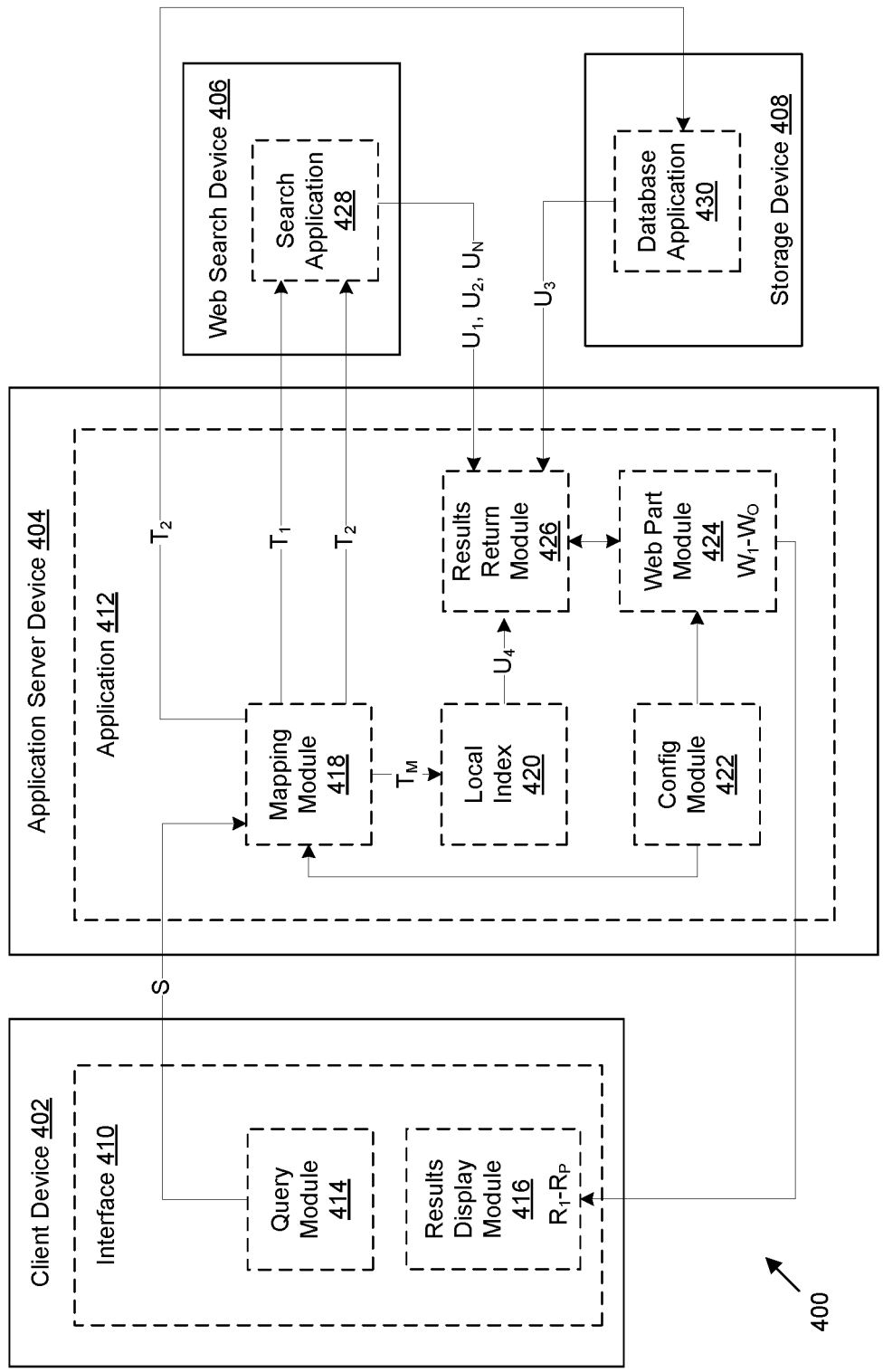
FIG. 4 shows example communications between example computing devices for routing and combining search query results.

Referring now to FIG. 4, an example block diagram 400 illustrates example communications between computing devices for routing and combining search query results in accordance with the present disclosure.

The block diagram 400 includes a client device 402, an application server device 404, a web search device 406, and a storage device 408. Other embodiments are possible. For example, the block diagram 400 may generally include more or fewer devices and/or other components as desired.

The client device 402 is similar to the client device 102 described above, and includes an interface 410 configured for accessing and interacting with business processes implemented by an application 412 executing on the application server device 404. The application server device 404 is similar to the server device 104 described above.

The interface 410 includes a query module 414 and a results display module 416, and the application 412 includes a mapping module 418, a local index 420, a configuration module 422, a web part module 424, and a results return module 426. Functionality of the respective example modules of the interface 410 and application 412 are described in further detail below.

The web search device 406 is a computing device and includes a search application 428 generally configured to search, crawl, and/or index information on the World Wide Web. An example of such a search application includes the BING® web search engine from Microsoft Corporation. The storage device 408 is also a computing device and includes a database application 430 generally configured to store, access and/or modify a collection of electronic data. An example of such a database application includes the ACTIVE DIRECTORY® service from Microsoft Corporation. Other embodiments of the search application 428 and database application 430 are possible.

In one example communications sequence, the query module 414 of the interface 410 receives an example string S="skiing vacation" from a user, and sends the string S to the mapping module 418 of the application 412. In one embodiment, the user enters the string S in the query module 414 (e.g., within a text field), and then executes a search query against the string S by engaging a selectable control (e.g., a button) within the query module 414. Other embodiments are possible.

The mapping module 418 receives the string S from the query module 414, reformulates the string S into a plurality of search queries $T_1$-$T_M$, where M is an arbitrary integer value, and sends each of the plurality of search queries $T_1$-$T_M$ to at least one information source. For example, search query $T_1$="ski equipment" may be generated by the mapping module 418 and then sent to the search application 428, search query $T_2$="ski resort reviews" may be formed and then transferred to the search application 428 and the database application 430, and search query $T_M$="ski travel promotions" may be constructed and then directed to the local index 420, which contains data structured in accordance with a schema associated with the application 412. In general, the plurality of search queries $T_1$-$T_M$ are formed in accordance with at least one mapping rule pre-defined via the configuration module 422 by a user (e.g., an administrator), discussed in further detail below in connection with FIG. 5.

The results return module 426 of the application 412 receives a plurality of query results $U_1$-$U_N$, where N is an arbitrary integer value, from the search application 428, database application 430, and/or the local index 420 in view of the plurality of search queries $T_1$-$T_M$ previously being sent to the same.

In the current example, query results $U_1$ and $U_2$ may be more closely related to each other than query results $U_3$, $U_4$, and $U_N$ in that these respective results may include at least one potential "hit" associated with the phrase "ski equipment" of the example search query $T_1$. For example, query result $U_1$ may include a results table of "ski jackets" which are of "equipment" type, and query result $U_2$ may include a results table of "ski goggles" which are also of "equipment" type; whereas query results $U_3$ and $U_N$ may include a results table of "ski resorts" which are of "review" type, and query result $U_4$ may include a results table of "marketing information" which is of "promotion" type. Other embodiments are possible.

The web part module 424 of the application 412 accesses the plurality of query results $U_1$-$U_N$ within the results return module 426 and generally operates on the same. Specifically, the web part module 424 includes a plurality of web parts $W_1$-$W_O$, where O is an arbitrary integer value. A web part is a re-useable software component that implements one or more controls that enable end users to view and modify content, appearance, and behavior of Web pages directly from a browser.

In example embodiments, each of the plurality of web parts $W_1$-$W_O$ accesses and evaluates each of the plurality of query results $U_1$-$U_N$ within the results return module 426. When a given web part is compatibly-configured to display at least one specific "type" of result associated with each of the respective plurality of query results $U_1$-$U_N$, then that particular web part renders an associated result(s) within at least one of a plurality of result sections $R_1$-$R_P$, where P is an arbitrary integer value, within the results display module 416 of the interface 410.

For example, assuming that the web part $W_1$ is configured to render a query result of "promotion" type, when this web part accesses and evaluates the plurality of query results $U_1$-$U_N$ within the results return module 426, the query result $U_4$ is picked-up by the web part $W_1$ and rendered within at least one of a plurality of result sections $R_1$-$R_P$ within the results display module 416. Similarly, when respective web parts $W_2$-$W_O$ access and evaluate each of the plurality of query results $U_1$-$U_N$ in the results return module 426, one or more of the plurality of query results $U_1$-$U_N$ are picked-up and rendered within at least one of a plurality of result sections $R_1$-$R_P$.

For example, assuming that the web part $W_2$ is configured to render a result of "review" type, when this web part accesses and evaluates the plurality of results $U_1$-$U_N$ in the results return module 426, the query results $U_3$ and $U_N$ are picked-up and rendered within at least one of a plurality of result sections $R_1$-$R_P$. In this example, the web part $W_2$ may concatenate or otherwise combine the query results $U_3$ and $U_N$ in accordance with at least one combining rule pre-defined via the configuration module 422, discussed in further detail below in connection with FIGS. 5 and 6.

Figure 5:
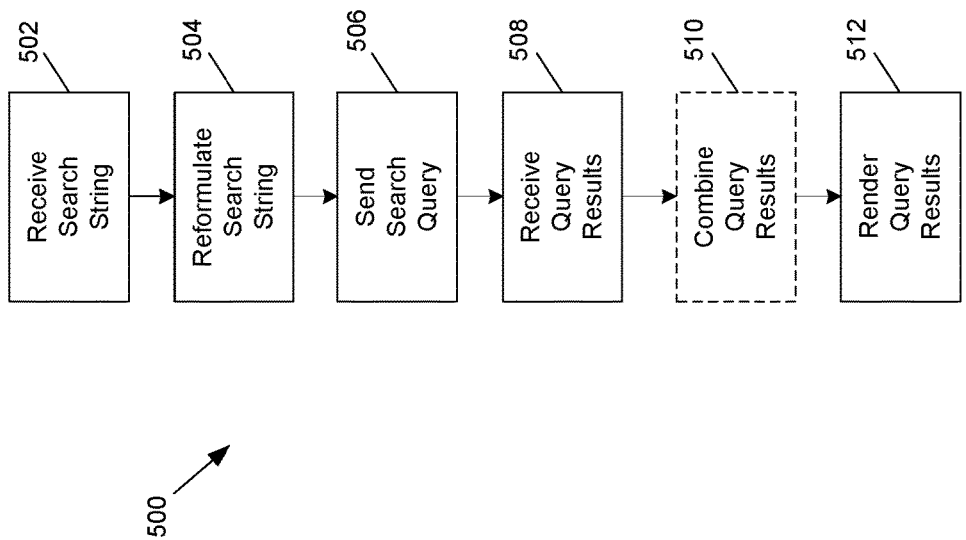
FIG. 5 shows a flowchart of an example method for routing search query results.

Referring now to FIG. 5, an example method 500 for routing and combining search query results is shown. In the example embodiment, the method 500 is implemented by the application 412 executing on the application server device 404 described above in connection with FIG. 4. Other embodiments are possible. For example, one or more modules of the application 412 may be located wholly or in part on one or more different computing devices in a networked computing environment in a "cloud" computing implementation.

The method 500 begins at a first module 502. The first module 502 is configured to receive a search string comprising at least one key term for comparison against content accessible to at least one information source (e.g., local index 420, search application 428, database application 430, etc.). In example embodiments, a "key term" can be any one of a user entered query term, a web part configured query term, and site navigation context or user context. In this manner, a "key term" can be any type of input (i.e., entered by a user and/or by configuring a web part and/or by the context of the web part) that is taken into consideration when it comes to determining recall and/or sorting/ranking according to the principles of the present disclosure. Other embodiments are possible.

Operational flow then proceeds to a second module 504. The second module 504 is configured to map the search string received by the first module 502 into at least one search query (e.g., "Author: John Doe" and "Document: .ppt") in accordance with one or more query mapping rules. In one embodiment, a particular query mapping rule additionally assigns at least one "type" to one or more expressions of a search query. For example, a search query expression "John Doe" might be assigned as "user" type and "author" type and a search query expression ".ppt" might be assigned as "document" type. Other embodiments are possible, Operational flow then proceeds to a third module 506. The third module 506 is configured to send the search query generated by or at the second module 504 to the at least one information source. In general, the information source is accessible over a network (e.g., network 108) within a networked computing environment (e.g., environment 100). Other embodiments are possible.

Operational flow then proceeds to a fourth module 508. The fourth module 508 is configured to receive a plurality of query results in view of the at least one search query sent by the third module 506. In one embodiment, each of the plurality of results is generically formatted as a results table collection, which is a set of results tables. In general, a results table may consist of a collection of results or information arranged in a row/column format in an ordered arrangement such as, for example, results listed according to a pre-defined ranking scheme (e.g., priority, significance, confidence, etc.), or an unordered arrangement (e.g., raw data). A results table may additionally include at least one "type" associated with the same. For example, a results table including a collection of ".ppt" results might be assigned as "document" type, and a results table including a collection of individual names might be assigned as "user" type and/or "author" type. Other embodiments are possible.

Operational flow then proceeds to a fifth module 510. The fifth module 510 is configured to optionally (indicated by intermittent lines in FIG. 5) combine two or more of the plurality of query results received by the fourth module 508. In one embodiment, example methods for combining query results include interleaving, stacking, and others. In general, rules for combining query results are defined via the configuration module 422 of FIG. 4, described in further detail below in connection with FIG. 6. Other embodiments are possible.

Operational flow then proceeds to a sixth module 512. The sixth module 512 is configured to render one or more of the plurality of query results within at least one of the plurality of result sections $R_1$-$R_P$ within the results display module 416 of the interface 410 of the client device 402 of FIG. 4.

Example logic that can be used to implement query mapping rule(s) and the rendering of query results within a client interface is described in U.S. patent application Ser. No. 13/287,999, the entirety of which is hereby incorporated by reference as stated above. Other embodiments are possible.

Figure 6:
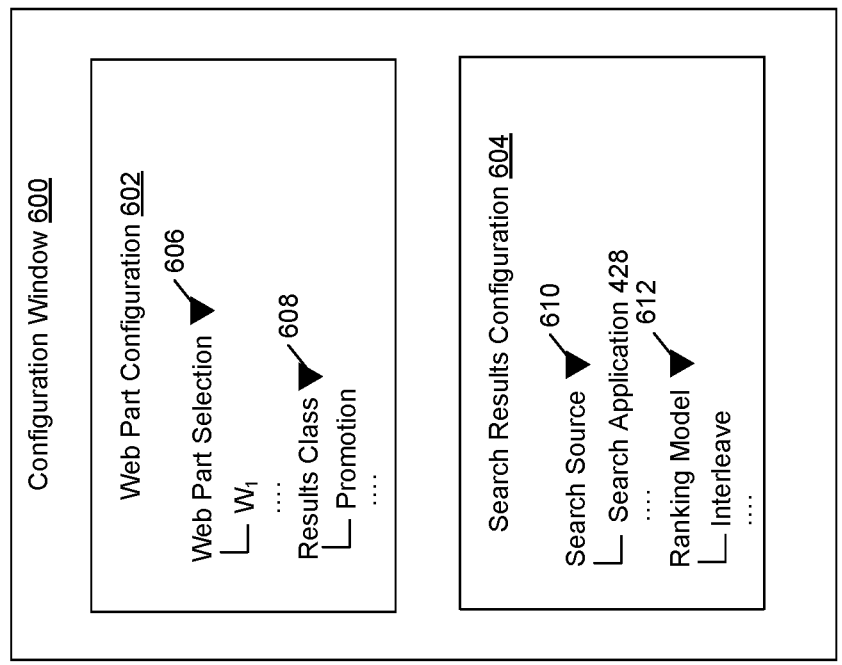
FIG. 6 shows an example configuration window for configuring parameters for routing search query results.

Referring now to FIG. 6, an example configuration window 600 for configuring web parts and search results for routing and combining search query results is shown in accordance with the present disclosure. In the example embodiment, the configuration window 600 includes a web part configuration section 602 and a search results configuration section 604. In general, the configuration window 600 is implemented and/or accessed via the configuration module 422 of the application 412 of FIG. 4. Other embodiments are possible.

The web part configuration section 602 includes a web part selection 606 and a results class selection 608. The web part selection 606 enables a user to select a particular web part (e.g., web part $W_1$) at least for the purpose of assigning at least one query result class to the particular web part indicating at least one "type" of query result the web part will be configured to render. The "type" of query result (e.g., "Promotion") that the particular web part will be configured to render is assigned via the results class selection 608. In the example embodiment, a plurality of other web parts and a plurality of other results classes (identified by the characters " . . . " in FIG. 6) is accessible by user manipulation of the web part selection 606 and results class selection 608, respectively.

The search results configuration section 604 includes a search source selection 610 and a ranking model selection 612. The search source selection 610 enables a user to identify at least information source (e.g., search application 428) a particular web part (e.g., web part $W_1$) can expect to potentially evaluate query results from. The ranking model selection 612 enables a user to define one or more rules or methods for combining query results such as, for example, interleaving, stacking, and others. In the example embodiment, a plurality of other search sources and a plurality of other ranking models (identified by the characters " . . . " in FIG. 6) is accessible by user manipulation of the search source selection 610 and ranking model selection 612, respectively.

Example rules include definitions that combine results tables when corresponding tables having a similar type such as, for example, "combine result tables having a "user" type and an "author" type," or a dissimilar type such as, for example, "combine result tables having a "document" type and an "author" type." Additionally, results tables may be preferably combined according to a pre-defined ranking scheme or model such as, for example, combining results table according to priority factor or classification. An example of a priority factor includes providing results returned according to a first mapping rule in a preferred position of a results table in comparison to results returned according to a second mapping rule that is defined, in time, following the first mapping rule. Still other embodiments are possible.

The example embodiments described herein can be implemented as logical operations in a computing device in a networked computing system environment. The logical operations can be implemented as: (i) a sequence of computer implemented instructions, steps, or program modules running on a computing device; and (ii) interconnected logic or hardware modules running within a computing device.

For example, embodiments of the present disclosure may be practiced via a system-on-a-chip (SOC) where each or many of the components illustrated in FIG. 2 may be integrated onto a single integrated circuit. Such an SOC device may include one or more processing units, graphics units, communication units, system virtualization units and application functionality, all of which are integrated onto a chip substrate as a single integrated circuit.

Additionally, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
one or more processors; and
a memory coupled to the one or more processors, the memory for storing instructions which, when executed by the one or more processors, performs a method for routing search query results, the method comprising:
receiving a search string comprising at least one key term;
generating a set of queries based on the at least one key term, wherein generating the set of queries comprises generating a first query by mapping at least some portion of the at least one key term to a first query, and generating a second query by mapping at least some portion of the at least one key term to a second query, wherein the first query and the second query are different;
providing one or more queries in the set of queries to an information source;
receiving a set of query results from the information source, wherein two or more query results in the set of query results include a result classification identifying a query result type and a priority classification identifying a ranking of a corresponding query result; and
combining the two or more query results into a combined query result based on the result classification.

2. The system of claim 1, wherein the key term is at least one of a user entered query term, a web part configured query term, a site navigation context and a user context.

3. The system of claim 1, wherein the at least one key term is mapped to the set of queries using a set of mapping rules.

4. The system of claim 3, wherein at least one rule in the set of mapping rules is operable to assign a type to the at least one key term.

5. The system of claim 1, wherein the set of query results are arranged in column and row format having an ordered arrangement.

6. The system of claim 5, wherein at least one column in the set of query results corresponds to one or more query result types, wherein each of the one or more query result types corresponds to a category associated with the search string.

7. The system of claim 5, wherein the ordered arrangement is arranged in accordance with a ranking schema, wherein the ranking schema is operable to rank query results based at least on the priority classification.

8. The system of claim 1, wherein at least two of the two or more query results are at least one of interleaved and stacked to form the combined query.

9. The system of claim 1, the method further comprising rendering at least a portion of the combined query result on an interface of a computing device.

10. The system of claim 1, wherein generating the set of queries further comprises:
assigning a first query type to the first query; and
assigning a second query type to the second query.

11. A method for routing search query results, the method comprising:
- receiving a search string comprising at least one key term;
- generating a set of queries based on the at least one key term, wherein generating the set of queries comprises generating a first query by mapping at least some portion of the at least one key term to a first query, and generating a second query by mapping at least some portion of the at least one key term to a second query, wherein the first query and the second query are different;
- providing one or more queries in the set of queries to an information source;
- receiving a set of query results from the information source, wherein two or more query results in the set of query results include a result classification identifying a query result type and a priority classification identifying a ranking of a corresponding query result; and
- combining the two or more query results into a combined query result based on the result classification.

12. The method of claim 11, wherein generating the set of queries comprises mapping the at least one key term to the set of queries using a set of mapping rules.

13. The method of claim 12, wherein at least one rule in the set of mapping rules is operable to assign a type to the at least one key term.

14. The method of claim 11, wherein the set of query results are arranged in column and row format having an ordered arrangement.

15. The method of claim 14, wherein at least one column in the set of query results corresponds to one or more query result types, wherein each of the one or more query result types corresponds to a category associated with the search string.

16. The method of claim 14, wherein the ordered arrangement is arranged in accordance with a ranking schema, wherein the ranking schema is operable to rank query results based at least on the priority classification.

17. The method of claim 11, wherein at least two of the two or more query results are at least one of interleaved and stacked to form the combined query.

18. A hardware device having computer-executable instructions that, when executed, cause a processor to perform actions comprising:
- receiving a search string comprising at least one key term;
- generating a set of queries based on the at least one key term, wherein generating the set of queries comprises generating a first query by mapping at least some portion of the at least one key term to a first query, and generating a second query by mapping at least some portion of the at least one key term to a second query, wherein the first query and the second query are different;
- providing one or more queries in the set of queries to an information source;
- receiving a set of query results from the information source, wherein two or more query results in the set of query results include a result classification identifying a query result type and a priority classification identifying a ranking of a corresponding query result; and
- combining the two or more query results into a combined query result based on the result classification.

19. The hardware device of claim 18, wherein generating the set of queries comprises mapping the at least one key term to the set of queries using a mapping rule, wherein the mapping rule is configured to assign a category type to the at least one key term.

20. The hardware device of claim 18, wherein the set of query results are arranged in column and row format having are arranged in accordance with a ranking schema, wherein the ranking schema is operable to rank query results based at least on the priority classification.

* * * * *